(12) United States Patent
Yoshimura et al.

(10) Patent No.: US 10,873,414 B2
(45) Date of Patent: Dec. 22, 2020

(54) TERMINAL APPARATUS, BASE STATION APPARATUS, AND COMMUNICATION METHOD

(71) Applicants: Sharp Kabushiki Kaisha, Sakai (JP); FG Innovation Company Limited, Tuen Mun (HK)

(72) Inventors: Tomoki Yoshimura, Sakai (JP); Shoichi Suzuki, Sakai (JP); Wataru Ouchi, Sakai (JP); Liqing Liu, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 0 days.

(21) Appl. No.: 16/484,516

(22) PCT Filed: Mar. 13, 2018

(86) PCT No.: PCT/JP2018/009700
§ 371 (c)(1),
(2) Date: Aug. 8, 2019

(87) PCT Pub. No.: WO2018/173852
PCT Pub. Date: Sep. 27, 2018

(65) Prior Publication Data
US 2020/0044768 A1    Feb. 6, 2020

(30) Foreign Application Priority Data
Mar. 22, 2017  (JP) ................................ 2017-055587

(51) Int. Cl.
*H04L 1/00*    (2006.01)
*H04L 1/18*    (2006.01)
(Continued)

(52) U.S. Cl.
CPC .......... *H04L 1/0004* (2013.01); *H04L 1/1614* (2013.01); *H04L 1/1812* (2013.01); *H04L 1/1835* (2013.01); *H04W 72/14* (2013.01)

(58) Field of Classification Search
CPC ... H04L 1/0006; H04L 1/0009; H04L 1/1812; H04L 1/0041; H04L 1/0025; H04L 1/0061; H04L 1/1835
See application file for complete search history.

(56) References Cited

U.S. PATENT DOCUMENTS

2013/0155832 A1\* 6/2013 Yang ..................... H04L 1/1671
370/203
2014/0241269 A1    8/2014 Smee et al.
(Continued)

FOREIGN PATENT DOCUMENTS

JP    2016-513428 A    5/2016
WO   2016/123438 A2   8/2016

OTHER PUBLICATIONS

Official Communication issued in International Patent Application No. PCT/JP2018/009700, dated Jun. 5, 2018.
(Continued)

*Primary Examiner* — Syed Ali
(74) *Attorney, Agent, or Firm* — Keating & Bennett, LLP

(57) ABSTRACT

A terminal apparatus includes a receiver configured to receive a transport block, and a decoding unit configured to decode the plurality of first code blocks, in which each of the plurality of first code blocks is coded based on a soft buffer size, the soft buffer size is given based on at least a first value, the first value is the number of the plurality of first code blocks in an initial transmission of the transport block, the number of the plurality of first code blocks is given based on a size of the transport block, the size of the transport block is given based on at least an MCS field included in the downlink control information, in a case that at least one
(Continued)

second code block is retransmitted, the first value is the number of the at least one second code block, and the at least one second code block includes some code blocks of the plurality of first code blocks resulting from the segmentation.

2 Claims, 9 Drawing Sheets

(51) Int. Cl.
 *H04L 1/16* (2006.01)
 *H04W 72/14* (2009.01)

(56) References Cited

U.S. PATENT DOCUMENTS

| | | | |
|---|---|---|---|
| 2015/0003384 A1* | 1/2015 | Kawasaki | H04L 1/1887 370/329 |
| 2016/0073339 A1* | 3/2016 | Tabet | H04L 1/0003 370/311 |
| 2016/0227540 A1* | 8/2016 | Chen | H04L 5/0064 |
| 2016/0233999 A1* | 8/2016 | Chendamarai Kannan | H04L 1/1861 |
| 2017/0163396 A1* | 6/2017 | Blankenship | H04W 72/042 |
| 2017/0366311 A1* | 12/2017 | Iyer | H04L 5/0007 |
| 2018/0234155 A1* | 8/2018 | Neuhaus | H04L 1/0026 |
| 2019/0028233 A1* | 1/2019 | Bontu | H04L 1/0026 |
| 2019/0044646 A1* | 2/2019 | Xu | H04W 72/042 |
| 2019/0327761 A1* | 10/2019 | Suzuki | H04W 72/12 |
| 2019/0357205 A1* | 11/2019 | Li | H04L 27/2601 |

OTHER PUBLICATIONS

NTT DOCOMO, "New SID Proposal: Study on New Radio Access Technology", 3GPP TSG RAN Meeting #71, RP-160671, Mar. 7-10, 2016, 8 pages.

"3rd Generation Partnership Project; Technical Specification Group Radio Access Network; Study on New Radio (NR) Access Technology Physical Layer Aspects (Release 15)", 3GPP TR 38.802 V0.0.3, Mar. 2016, pp. 1-19.

Samsung, "CB-group based retransmission for eMBB", 3GPP TSG RAN WG1 Meeting #88, R1-1702990, Feb. 13-17, 2017, pp. 1-9.

* cited by examiner

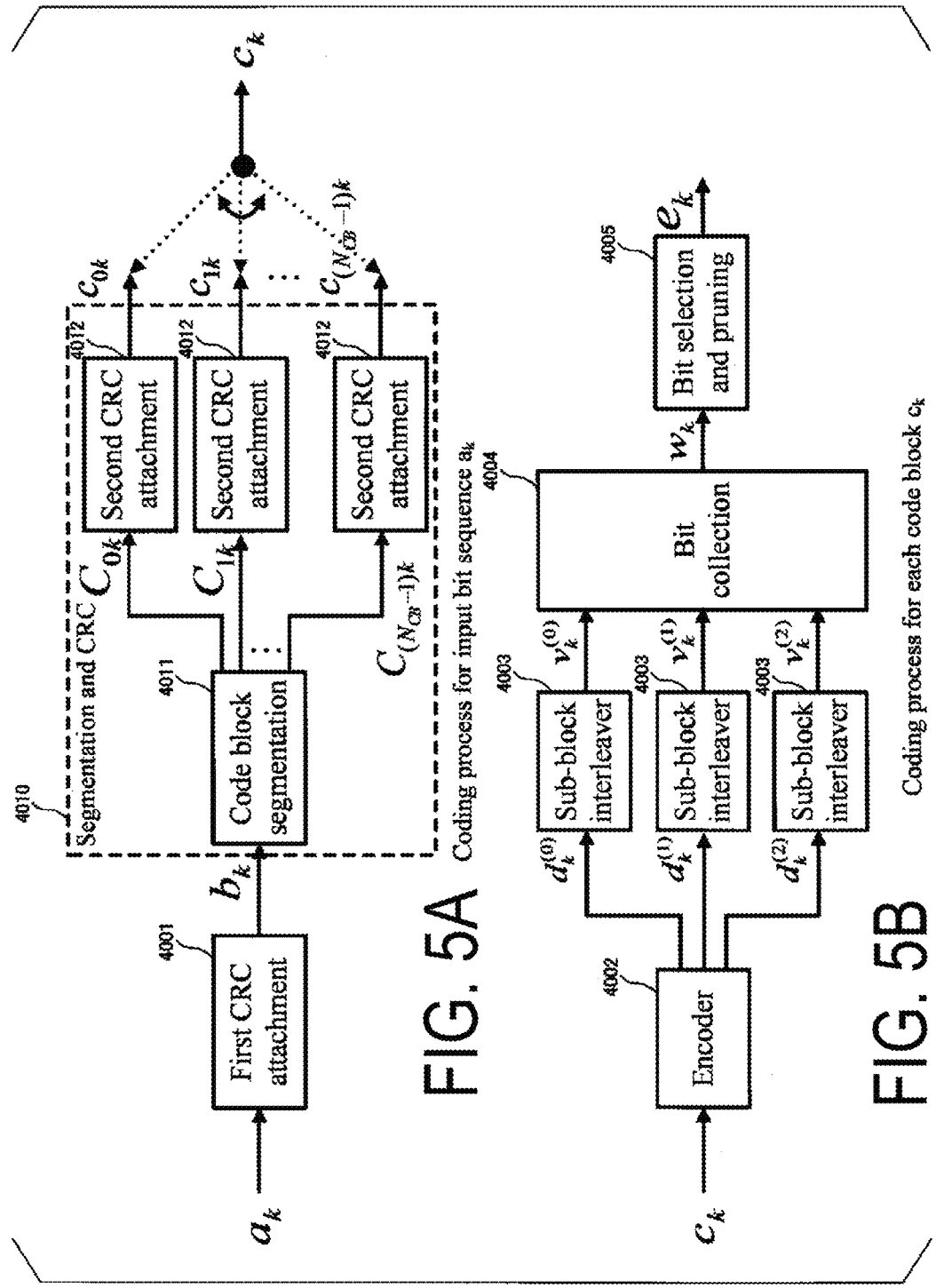
FIG. 5A Coding process for input bit sequence $a_k$
FIG. 5B Coding process for each code block $c_k$ $$\begin{cases} \text{if } B \le Z \\ \quad L = 0 \\ \quad \text{Number of code blocks: } N_{CB} = 1 \\ \quad B' = B \\ \text{else} \\ \quad L = 24 \\ \quad \text{Number of code blocks: } N_{CB} = ceil(B/(Z-L)) \\ \quad B' = B + N_{CB} \cdot L \\ \text{end if} \\ \\ B: \text{Length of the sequence } b_k \\ Z: \text{Maximum code block size} \\ N_{CB}: \text{Number of code blocks} \\ B': \text{Length of the sequence } b_k \text{ including Second CRC bits} \\ L: \text{Length of the Second CRC bits} \end{cases}$$

FIG. 6

Set $k_0 = R_{subblock} \cdot \left( 2 \cdot \left\lceil \dfrac{N_{cb}}{8R_{subblock}} \right\rceil \cdot rv_{idx} + 2 \right)$ Set $k = 0$ and $j = 0$ while $\{ k < E \}$ if $w_{(k_0+j) \bmod N_{cb}} \neq \,<NULL>$ $e_k = w_{(k_0+j) \bmod N_{cb}}$
        $k = k + 1$ end if $j = j + 1$ end while

FIG. 7

| Code block | #0 | #1 | #2 | #3 | #4 | #5 | #6 |
|---|---|---|---|---|---|---|---|
| Bit map | 1 | 0 | 1 | 0 | 0 | 1 | 0 |

FIG. 8A  Bit map for each code block

| Code block | #0 | #1 | #2 | #3 | #4 | #5 | #6 |
|---|---|---|---|---|---|---|---|
| Code block group | #0 | | #1 | | #2 | | |
| Bit map | 1 | | 0 | | 0 | | |

FIG. 8B  Bit map for each code block group

| CODE POINT | OPERATION OF TERMINAL APPARATUS 1 |
|---|---|
| 00 | TRANSMIT CODE BLOCK GROUP #0 |
| 01 | TRANSMIT CODE BLOCK GROUP #1 |
| 10 | TRANSMIT CODE BLOCK GROUP #2 |
| 11 | TRANSMIT CODE FIRST CODE BLOCK SET |

FIG. 9

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority based on JP 2017-055587 filed on Mar. 22, 2017, the contents of which are incorporated herein by reference.

BACKGROUND ART

In the 3rd Generation Partnership Project (3GPP), a radio access method and a radio network for cellular mobile communications (hereinafter, referred to as "Long Term Evolution (LTE)", or "Evolved Universal Terrestrial Radio Access (EUTRA)") have been studied. In LTE, a base station apparatus is also referred to as an evolved NodeB (eNodeB), and a terminal apparatus is also referred to as a User Equipment (UE). LTE is a cellular communication system in which multiple areas are deployed in a cellular structure, with each of the multiple areas being covered by a base station apparatus. A single base station apparatus may manage multiple cells.

In the 3GPP, the next generation standard (New Radio: NR) has been studied in order to make a proposal to the International Mobile Telecommunication (IMT)-2020 which is a standard for the next generation mobile communication system defined by the International Telecommunications Union (ITU) (NPL 1). NR has been expected to satisfy a requirement considering three scenarios of enhanced Mobile BroadBand (eMBB), massive Machine Type Communication (mMTC), and Ultra Reliable and Low Latency Communication (URLLC), in a single technology framework.

In order to satisfy the above requirement, an error correction code adopted in NR has been studied (NPL 2).

CITATION LIST

Non Patent Literature

NPL 1: "New SID proposal: Study on New Radio Access Technology", RP-160671, NTT docomo, 3GPP TSG RAN Meeting#71, Goteborg, Sweden, 7-10 Mar. 2016.
NPL 2: "3GPP TR 38.802 V0.0.3 (2016-03)", R1-165889, 9 Jun. 2016.

SUMMARY OF INVENTION

Technical Problem

An aspect of the present invention provides a base station apparatus capable of efficiently performing error-correction coding, a communication method used for the base station apparatus, a terminal apparatus capable of efficiently performing error-correction coding, and a communication method used for the terminal apparatus.

Solution to Problem (1) A first aspect of the present invention is a terminal apparatus including a receiver configured to receive a transport block based on a downlink grant, the transport block being subjected to segmentation into a plurality of first code blocks, and a decoding unit configured to decode the plurality of first code blocks, in which each of the plurality of first code blocks is coded based on a soft buffer size, the soft buffer size is given based on at least a first value, the first value is the number of the plurality of first code blocks in an initial transmission of the transport block, the number of the plurality of first code blocks is given based on a size of the transport block, the size of the transport block is given based on at least an MCS field included in the downlink control information, in a case that at least one second code block is retransmitted, the first value is the number of the at least one second code block, and the at least one second code block includes some code blocks of the plurality of first code blocks resulting from the segmentation.

(2) A second aspect of the present invention is a base station apparatus including a transmitter configured to transmit a transport block based on a downlink grant, the transport block being subjected to segmentation into a plurality of first code blocks, and a coding unit configured to code the plurality of first code blocks, in which each of the plurality of first code blocks is coded based on a soft buffer size, the soft buffer size is given based on at least a first value, the first value is the number of the plurality of first code blocks in an initial transmission of the transport block, the number of the plurality of first code blocks is given based on a size of the transport block, the size of the transport block is given based on at least an MCS field included in the downlink control information, in a case that at least one second code block is retransmitted, the first value is the number of the at least one second code block, and the at least one second code block includes some code blocks of the plurality of first code blocks resulting from the segmentation.

(3) A third aspect of the present invention is a communication method for a terminal apparatus, the communication method including the steps of receiving a transport block based on a downlink grant, the transport block being subjected to segmentation into a plurality of first code blocks, and decoding the plurality of first code blocks, in which each of the plurality of first code blocks is coded based on a soft buffer size, the soft buffer size is given based on at least a first value, the first value is the number of the plurality of first code blocks in an initial transmission of the transport block, the number of the plurality of first code blocks is given based on a size of the transport block, the size of the transport block is given based on at least an MCS field included in the downlink control information, in a case that at least one second code block is retransmitted, the first value is the number of the at least one second code block, and the at least one second code block includes some code blocks of the plurality of first code blocks resulting from the segmentation.

(4) A fourth aspect of the present invention is a communication method for a base station apparatus, the communication method including the steps of transmitting a transport block based on a downlink grant, the transport block being subjected to segmentation into a plurality of first code blocks, and coding the plurality of first code blocks, in which each of the plurality of first code blocks is coded based on a soft buffer size, the soft buffer size is given based on at least a first value, the first value is the number of the plurality of first code blocks in an initial transmission of the transport block, the number of the plurality of first code blocks is given based on a size of the transport block, the size of the transport block is given based on at least an MCS field included in the downlink control information, in a case that at least one second code block is retransmitted, the first value is the number of the at least one second code block, and the at least one second code block includes some code blocks of the plurality of first code blocks resulting from the segmentation.

Advantageous Effects of Invention

According to an aspect of the present invention, a base station apparatus and a terminal apparatus can efficiently communicate with each other.

BRIEF DESCRIPTION OF DRAWINGS

FIGS. 5A and 5B are block diagrams schematically illustrating a Coding process of a base station apparatus 3 according to the present embodiment.

FIG. 6 is a diagram illustrating an example of a first procedure for calculating the number of code blocks in a code block segmentation section 4011 according to an aspect of the present embodiment.

FIG. 7 is a diagram illustrating an example of a rate matching operation in a bit selection and pruning section 4005 according to an aspect of the present embodiment.

FIGS. 8A and 8B are diagrams illustrating an example of information indicating a second code block set according to an aspect of the present embodiment.

FIG. 9 is an example of information indicating the second code block set according to an aspect of the present embodiment.

DESCRIPTION OF EMBODIMENTS

Hereinafter, embodiments of the present invention will be described.

Figure 1:
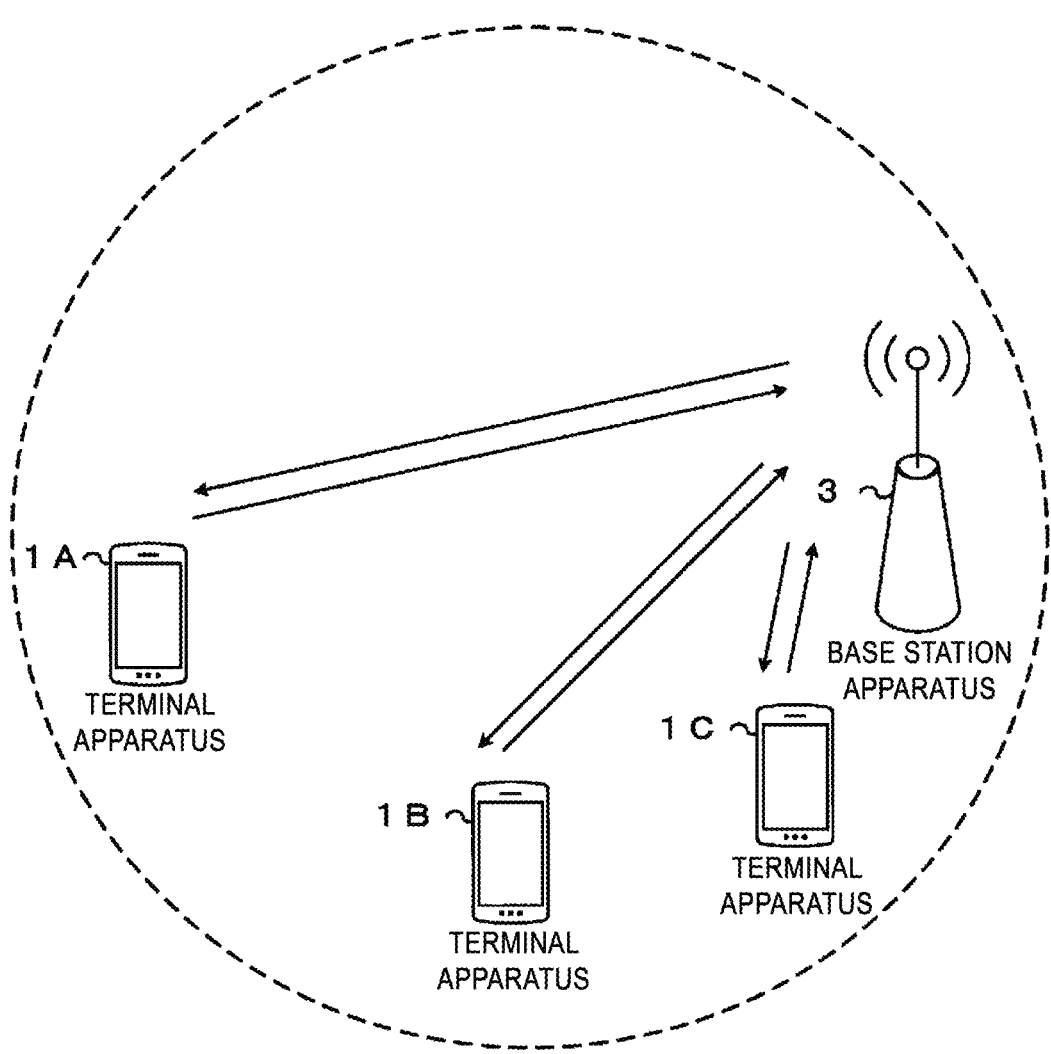
FIG. 1 is a diagram illustrating a concept of a radio communication system according to an aspect of the present embodiment.

FIG. 1 is a conceptual diagram of a radio communication system according to an aspect of the present embodiment. In FIG. 1, a radio communication system includes terminal apparatuses 1A to 1C and a base station apparatus 3. Hereinafter, the terminal apparatuses 1A to 1C are also referred to as a terminal apparatus 1.

Hereinafter, various radio parameters for communication between the terminal apparatus 1 and the base station apparatus 3 will be described. Here, at least some of the radio parameters (e.g., Subcarrier Spacing: SCS) are also referred to as Numerology. The radio parameters include at least some of a subcarrier spacing, an OFDM symbol length, a subframe length, a slot length, and a mini-slot length.

The subcarrier spacing may be classified into two, a reference subcarrier spacing (Reference SCS, Reference Numerology) and a subcarrier spacing for communication schemes used for actual radio communications (Actual SCS, Actual Numerology). The reference subcarrier spacing may be used to determine at least some of the radio parameters. For example, the reference subcarrier spacing is used to configure a subframe length. Here, the reference subcarrier spacing is 15 kHz, for example.

The subcarrier spacing used for actual radio communication is one of the radio parameters for communication schemes used for the radio communication between the terminal apparatus 1 and the base station apparatus 3 (e.g. Orthogonal Frequency Division Multiplex: OFDM, Orthogonal Frequency Division Multiple Access: OFDMA, Single Carrier-Frequency Division Multiple Access: SC-FDMA, and Discrete Fourier Transform-spread-OFDM: DFT-s-OFDM). Hereinafter, the reference subcarrier spacing is also referred to as a first subcarrier spacing. The subcarrier spacing used for actual radio communication is also referred to as a second subcarrier spacing.

Figure 2:
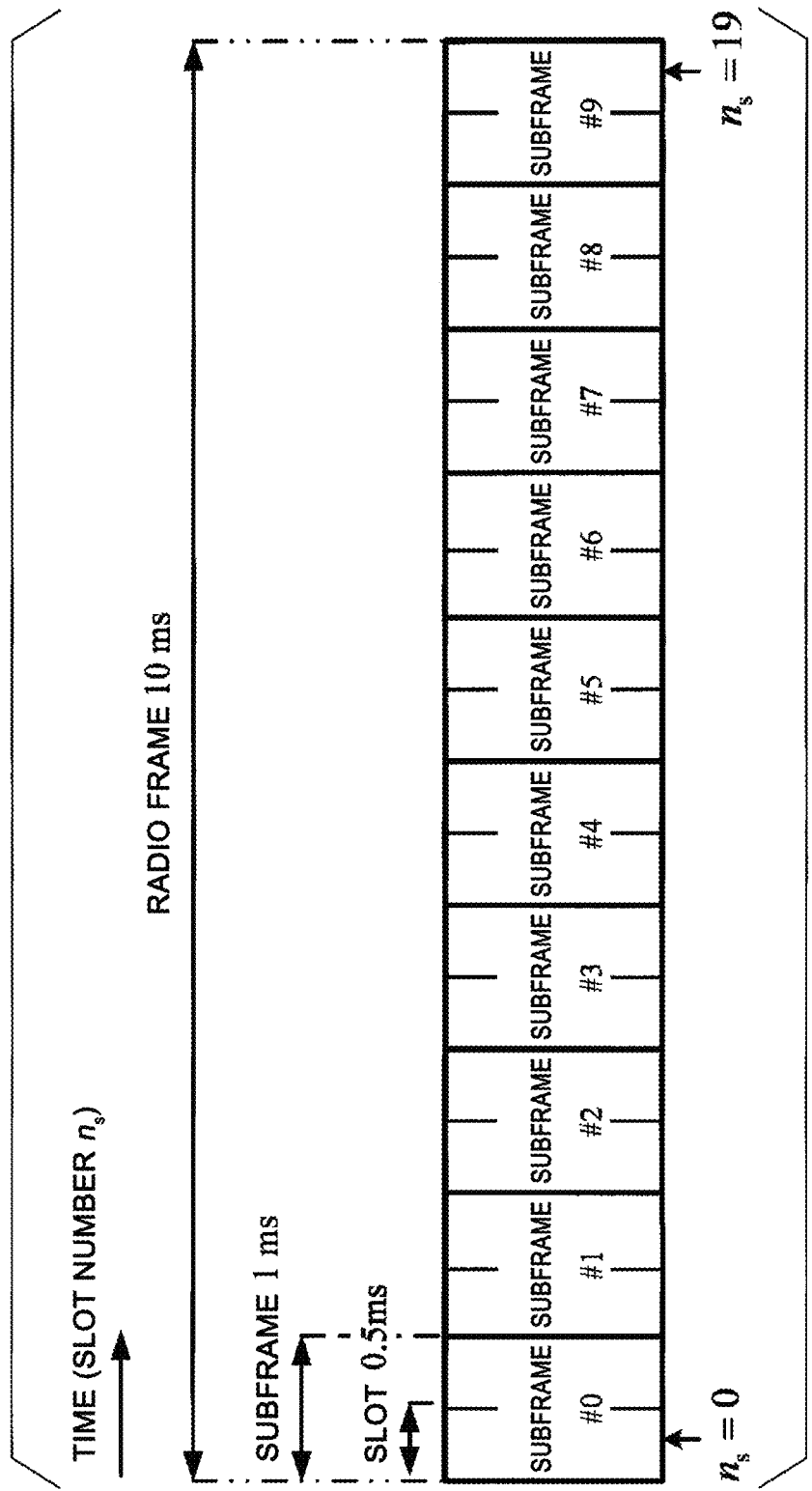
FIG. 2 is an example illustrating a configuration of a radio frame, a subframe, and a slot according to an aspect of the present embodiment.

FIG. 2 is an example illustrating a configuration of a radio frame, a subframe, and a slot according to an aspect of the present embodiment. In FIG. 2, a slot length is 0.5 ms, a subframe length is 1 ms, and a radio frame length is 10 ms. The slot may be a unit of resource allocation in a time domain. The slot may be a unit in which a transport block is mapped. The transport block may be mapped to one slot. The subframe may be a unit in which the transport block is mapped. The transport block may be mapped to one subframe. Here, the transport block may be a unit of data transmitted within a prescribed interval (e.g., Transmission Time Interval (TTI)) defined by a higher layer (e.g., Mediam Access Control (MAC) and the like). The transport block may be any of a data block, transport data, transmission data, a transmission code, a transmission block, a payload, information, an information block, coded data, downlink data, and uplink data.

The slot length may be given by the number of OFDM symbols. For example, the number of OFDM symbols may be 7, 14, or 28. The slot length may be given at least based on the OFDM symbol length. The OFDM symbol length may vary at least based on the second subcarrier spacing. The OFDM symbol length may be given at least based on the number of points in the Fast Fourier Transform (FFT) used to generate the OFDM symbol. The OFDM symbol length may include a length of a Cyclic Prefix (CP) added to the OFDM symbol. Here, the OFDM symbol is also referred to as a symbol. In a case that a communication scheme other than the OFDM is used in communication between the terminal apparatus 1 and the base station apparatus 3 (for example, a case that the SC-FDMA or the DFT-s-OFDM is used, or the like), the SC-FDMA symbol and/or the DFT-s-OFDM symbol to be generated are also referred to as the "OFDM symbol". For example, the slot length may be 0.25 ms, 0.5 ms, 1 ms, 2 ms, or 3 ms.

Hereinafter, radio resources and various channels will be described.

The radio resources are resources used for radio communication between the terminal apparatus 1 and the base station apparatus 3. Various channels may be mapped to the radio resources. The various channels may include at least some or all of a synchronization channel, a broadcast channel, a control channel, a shared channel, and reference signals.

The synchronization channel is also referred to as a synchronization signal. The synchronization signal is used for the terminal apparatus 1 to take synchronization in the frequency and time domains in the downlink.

The broadcast channel is also referred to as a Physical Broadcast CHannel (PBCH). The broadcast channel is used to broadcast a Master Information Block (MIB) that is used in common to the terminal apparatuses 1. The master information block may include a radio frame number.

The control channel is also referred to as a Physical Downlink Control CHannel (PDCCH). The control channel is used to transmit downlink control information. The downlink control information is also referred to as a Downlink Control Information (DCI) format. The downlink control information includes a downlink grant or an uplink grant. The downlink grant is also referred to as a downlink assignment or a downlink allocation.

The shared channel includes at least a Physical Downlink Shared CHannel (PDSCH) and a Physical Uplink Shared CHannel (PUSCH). The shared channel is used to transmit a transport block. The PDSCH resource allocation may be indicated by a downlink grant included in the control channel. The PUSCH resource allocation may be indicated by an uplink grant included in the control channel.

The reference signal is used for channel estimation for the radio resources.

Figure 3:
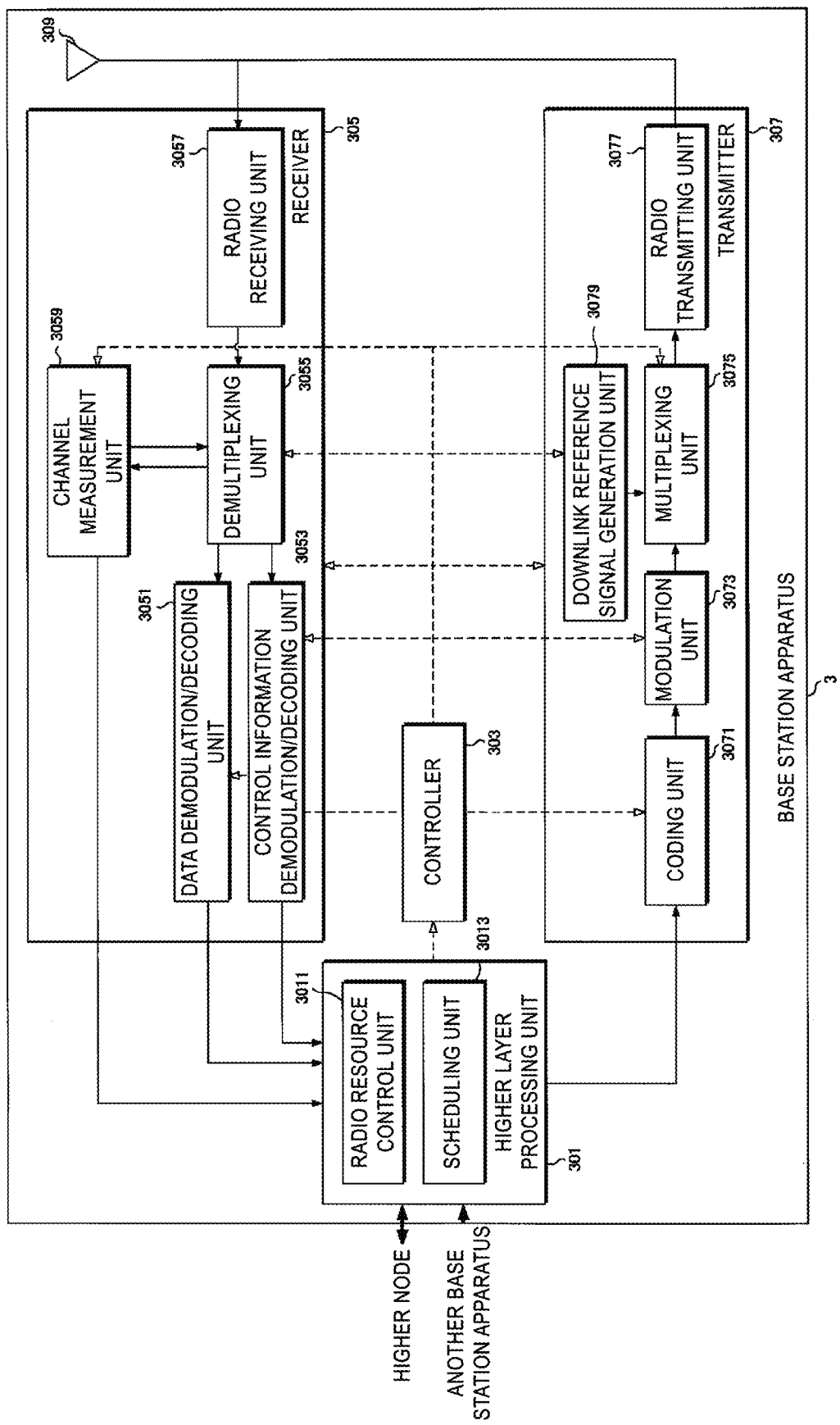
FIG. 3 is a schematic block diagram illustrating a configuration example of a base station apparatus according an aspect of the present embodiment.

FIG. 3 is a schematic block diagram illustrating a configuration example of the base station apparatus according an aspect of the present embodiment. As is illustrated in the drawing, the base station apparatus 3 includes at least some or all of a higher layer processing unit 301, a controller 303, a receiver 305, a transmitter 307, and a transmit and receive antenna 309. The higher layer processing unit 301 includes at least some or all of a radio resource control unit 3011 and a scheduling unit 3013. The receiver 305 includes at least some or all of a data demodulation/decode unit 3051, a control information demodulation/decode unit 3053, a demultiplexing unit 3055, a radio receiving unit 3057, and a channel measurement unit 3059. The transmitter 307 includes at least some or all of a coding unit 3071, a modulation unit 3073, a multiplexing unit 3075, a radio transmitting unit 3077, and a downlink reference signal generation unit 3079.

The higher layer processing unit 301 performs at least some or all of the processings of a Medium Access Control (MAC) layer, a Packet Data Convergence Protocol (PDCP) layer, a Radio Link Control (RLC) layer, and a Radio Resource Control (RRC) layer. The higher layer processing unit 301 generates control information for controlling the receiver 305 and the transmitter 307, and outputs the generated control information to the controller 303. Note that a part of the processing of the medium access control layer may be implemented in the controller 303.

The radio resource control unit 3011 can generate a transport block or acquire a transport block from a higher node, and output the transport block to the scheduling unit 3013 or the controller 303. The radio resource control unit 3011 manages various configurations information for each of the terminal apparatuses 1.

The scheduling unit 3013 manages the radio resources allocated for transmission of the transport block generated in the radio resource control unit 3011. In a case that the transport block generated in the radio resource control unit 3011 is transmitted to the terminal apparatus 1, the scheduling unit 3013 can generate downlink control information indicating the allocation of radio resources to the terminal apparatus 1, and output the generated downlink control information to the transmitter 307.

The controller 303 generates control signals for controlling the receiver 305 and the transmitter 307 based on the control information output from the higher layer processing unit 301. The controller 303 outputs the generated control signals to the receiver 305 and the transmitter 307 to control the receiver 305 and the transmitter 307.

The controller 303 may be provided with a function to perform a part of the processing of the medium access control layer (e.g., a retransmission indication, or the like).

In accordance with the control signal input from the controller 303, the receiver 305 demultiplexes, demodulates, and decodes the reception signal received from the terminal apparatus 1 through the transmit and receive antenna 309, and outputs information resulting from the decoding to the higher layer processing unit 301.

The radio receiving unit 3057 orthogonally-demodulates the uplink signal received through the transmit and receive antenna 309, and converts the orthogonally-demodulated analog signal into a digital signal. The radio receiving unit 3057 performs Fast Fourier Transform (FFT) on the digital signal, extracts a signal in the frequency domain, and outputs the resulting signal to the demultiplexing unit 3055.

The demultiplexing unit 3055 demultiplexes the signal input from the radio receiving unit 3057 into the control channel, the shared channel, and the signal such as the reference signal. The demultiplexing unit 3055 makes a compensation of the control channel and/or the shared channel from a channel estimate input from the channel measurement unit 3059. The demultiplexing unit 3055 outputs the demultiplexed reference signal to the channel measurement unit 3059.

The demultiplexing unit 3055 acquires a modulation symbol of the transport block and/or a modulation symbol including the uplink control information from the demultiplexed control channel and/or shared channel. The demultiplexing unit 3055 outputs the modulation symbol including the uplink data acquired from the shared channel signal to the data demodulation/decode unit 3051. The demultiplexing unit 3055 outputs the modulation symbol including the uplink control information acquired from the control channel or the shared channel to the control information demodulation/decode unit 3053. The uplink control information includes a reception acknowledgment, a Scheduling Request (SR), and the like.

The channel measurement unit 3059 measures the channel estimate, the channel quality, and the like, based on the reference signal input from the demultiplexing unit 3055, and outputs a result of the measurement to the demultiplexing unit 3055 and the higher layer processing unit 301.

The data demodulation/decode unit 3051 demodulates the modulation symbol of the transport block input from the demultiplexing unit 3055. A sequence after the demodulation is decoded to generate a transport block. The data demodulation/decode unit 3051 outputs the decoded transport block to the higher layer processing unit 301.

The control information demodulation/decode unit 3053 demodulates the modulation symbol including the uplink control information input from the demultiplexing unit 3055. A sequence after the demodulation is decoded to generate uplink control information. The control information demodulation/decode unit 3053 outputs the decoded uplink control information to the higher layer processing unit 301 or the controller 303.

The transmitter 307 generates a reference signal, codes and modulates the downlink control information and transport block input from the higher layer processing unit 301, and transmits a result of the modulation, including some or all of the control channel, the shared channel, and the reference signals, to the terminal apparatus 1 via the transmit and receive antenna 309.

The coding unit 3071 performs coding on the downlink control information and/or transport block input from the higher layer processing unit 301 based on a prescribed procedure. The coding based on a prescribed procedure in the coding unit 3071 is described later in detail.

The modulation unit 3073 modulates coded bits input from the coding unit 3071, in compliance with a modulation scheme such as Binary Phase Shift Keying (BPSK), Quadrature Phase Shift Keying (QPSK), Quadrature Amplitude Modulation (16QAM), and 64QAM.

The downlink reference signal generation unit 3079 generates a reference signal. The multiplexing unit 3075 multiplexes the modulation symbol of each channel and the reference signal to generate a transmission symbol.

The radio transmitting unit 3077 performs Inverse Fast Fourier Transform (IFFT) on the multiplexed transmission symbol and the like to generate a time symbol. The radio transmitting unit 3077 performs modulation on the time symbol in compliance with an OFDM scheme to generate a baseband digital signal, converts the baseband digital signal into an analog signal, generates an in-phase component and orthogonal component of an intermediate frequency from the analog signal, removes frequency components unnecessary for the intermediate frequency band, up-converts the signal of the intermediate frequency into a signal of a high frequency, and removes unnecessary frequency components to generate a carrier wave signal (Carrier signal, Carrier, RF signal, and the like). The radio transmitter 3077 performs power amplification on the carrier wave signal, and outputs a resulting signal to the transmit and receive antenna 309 for transmission.

Figure 4:
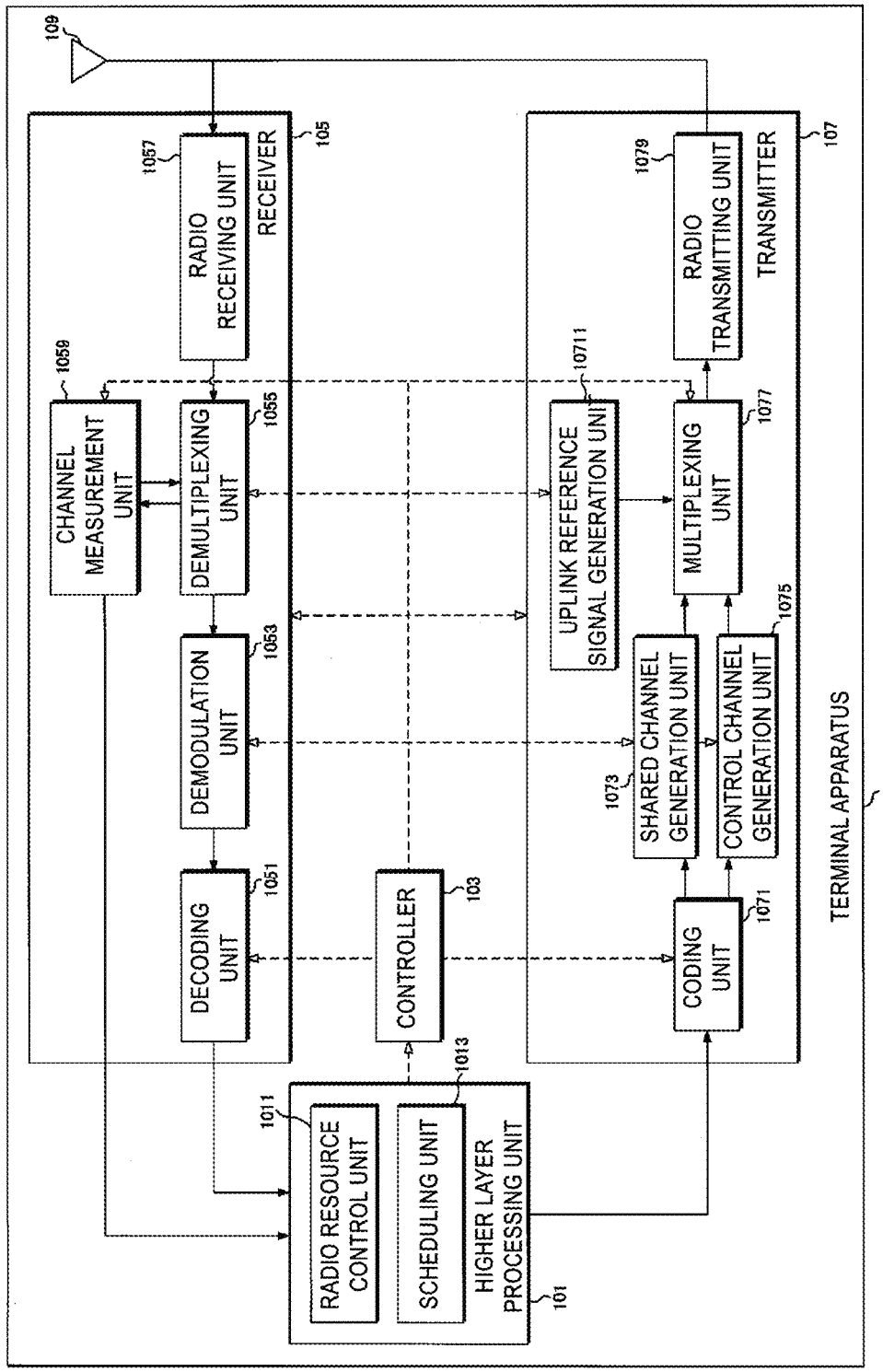
FIG. 4 is a schematic block diagram illustrating a configuration example of a terminal apparatus 1 according to an aspect of the present embodiment.

FIG. 4 is a schematic block diagram illustrating a configuration example of the terminal apparatus 1 according to an aspect of the present embodiment. As illustrated in the drawing, the terminal apparatus 1 includes a higher layer processing unit 101, a controller 103, a receiver 105, a transmitter 107, and a transmit and receive antenna 109. The higher layer processing unit 101 includes at least some or all of a radio resource control unit 1011 and a scheduling unit 1013. The receiver 105 include at least some or all a decoding unit 1051, a demodulation unit 1053, a demultiplexing unit 1055, a radio receiving unit 1057, and a channel measurement unit 1059. The transmitter 107 includes at least some or all of a coding unit 1071, a shared channel generation unit 1073, a control channel generation unit 1075, a multiplexing unit 1077, a radio transmitting unit 1079, and an uplink reference signal generation unit 10711.

The higher layer processing unit 101 outputs a transport block generated by a user operation or the like to the transmitter 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer. The higher layer processing unit 101 generates control information for controlling the receiver 105 and the transmitter 107, and outputs the generated control information to the controller 103. Note that a part of the processing of the medium access control layer may be implemented in the controller 103.

The radio resource control unit 1011 manages various configurations information for each of the terminal apparatuses 1. The various configurations information may include some or all of a configuration for the radio resource control, a configuration for Radio Resource Management (RRM) measurement, a configuration for RRM reporting, a configuration for CSI measurement, a configuration for CSI reporting, a configuration for transmit power control, a configuration for the physical channels, and a configuration for the physical signals and a configuration for the cells. The various configurations information may be information provided by the base station apparatus 3 and used to be configured for the terminal apparatus 1. The radio resource control unit 1011 generates information to be mapped to an uplink physical channel, and outputs the generated information to the transmitter 107. The information mapped to the uplink physical channel may be a transport block.

The scheduling unit 1013 controls the radio resources used in the transmitter 107, based on the information included in an uplink grant. The scheduling unit 1013 controls the radio resources used in the receiver 105, based on the information included in a downlink grant.

In accordance with the control information originating from the higher layer processing unit 101, the controller 103 generates a control signal for control of the receiver 105 and the transmitter 107. The controller 103 outputs the generated control signal to the receiver 105 and the transmitter 107 to control the receiver 105 and the transmitter 107.

The controller 103 may be provided with a function to perform a part of the processing of the medium access control layer (e.g., a retransmission indication, or the like). The controller 103 may be a function included in the higher layer processing unit 101.

The receiver 105 demultiplexes, demodulates, and decodes the reception signal received from the base station apparatus 3 through the transmit and receive antenna 109, and outputs information resulting from the decoding to the higher layer processing unit 101.

The radio receiving unit 1057 demodulates the downlink signal received through the transmit and receive antenna 109 and converts the demodulated analog signal to a digital signal. For example, the radio receiving unit 1057 may perform Fast Fourier Transform (FFT) on the digital signal and extract a signal in the frequency domain.

The demultiplexing unit 1055 demultiplexes the extracted signal into the control channel, the shared channel, and the reference signal. The demultiplexing unit 1055 outputs the demultiplexed reference signal to the channel measurement unit 1059 and/or the demultiplexing unit 1055.

The demultiplexing unit 1055 performs Channel Equalization on the control channel and/or the shared channel. The control channel after the channel equalization and/or the shared channel after the channel equalization are output to the demodulation unit 1053.

The channel measurement unit 1059 performs channel measurement based on the reference signal. A channel measurement value given based on the channel measurement is output to the demultiplexing unit 1055.

The demodulation unit 1053 performs demodulation corresponding to the modulation scheme such as BPSK, QPSK, 16QAM, and 64QAM, on the control channel after the channel equalization and/or the shared channel after the channel equalization. The demodulation unit 1053 outputs a sequence after the demodulation to the decoding unit 1051.

The decoding unit 1051 decodes the sequence after the demodulation, based on a prescribed procedure to generate a transport block. The decoding unit 1051 outputs the transport block to the higher layer processing unit 101. The decoding based on a prescribed procedure in the decoding unit 1051 is a decoding operation under assumption of the coding based on a prescribed procedure in the base station apparatus 1. In other words, the decoding unit 1051 assumes, in decoding the transport block, that the transport block has been coded based on a prescribed procedure.

The transmitter 107 generates a reference signal, codes and modulates the transport block and uplink control information input from the higher layer processing unit 101, at least multiplies some or all of the shared channel, the control channel, and the reference signals, and transmits the resultant signal to the base station apparatus 3 via the transmit and receive antenna 109.

The coding unit 1071 codes the uplink control information and/or transport block input from the higher layer processing unit 101, based on a prescribed procedure to generate coded bits, and outputs the coded bits to the shared channel generation unit 1073 and/or the control channel generation unit 1075. The coding details based on a prescribed procedure in the coding unit 1071 are described later in detail.

The shared channel generation unit 1073 may modulate the coded bits input from the coding unit 1071 to generate a modulation symbol, at least perform DFT on the modulation symbol to generate a shared channel, and output the generated shared channel to the multiplexing unit 1077. The shared channel generation unit 1073 may modulate the coded bits input from the coding unit 1071 to generate a shared channel and output the generated shared channel to the multiplexing unit 1077.

The control channel generation unit 1075 generates a control channel, based on the coded bits input from the coding unit 1071 and/or a scheduling request, and outputs the generated control channel to the multiplexing unit 1077.

The uplink reference signal generation unit 10711 generates a reference signal, and outputs the generated uplink reference signal to the multiplexing unit 1077.

The multiplexing unit 1077 multiplexes the channel input from the shared channel generation unit 1073 and/or the channel input from the control channel generation unit 1075 and/or the reference signal input from the uplink reference signal generation unit 10711 on the uplink radio resources. The multiplexing unit 1077 outputs the multiplexed signal to the radio transmitting unit 1079.

The radio transmitting unit 1079 performs Inverse Fast Fourier Transform (IFFT) on the multiplexed signal to generate a baseband digital signal, converts the baseband digital signal into an analog signal, generates an in-phase component and orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a resulting signal to the transmit and receive antenna 109 for transmission.

Hereinafter, the coding by the base station apparatus 3 according to an aspect of the present embodiment will be described.

FIGS. 5A and 5B are block diagrams schematically illustrating a Coding process of the base station apparatus 3 according to the present embodiment. FIG. 5A illustrates a procedure from the input of an input bit sequence $a_k$ to the generation of one or more code blocks $c_k$. The input bit sequence $a_k$ is a bit sequence input in the coding procedure. The input bit sequence $a_k$ may be a transport block. The code block $c_k$ may be a unit in which error-correction coding (channel coding) is performed. FIG. 5B illustrates a procedure from the input of a given code block $c_k$ to the generation of a rate matching sequence $e_k$. The coding procedure includes at least some or all of a First CRC addition section 4001, a Segmentation and CRC section 4010, an Encoder section 4002, a Sub-block interleaver section 4003, a Bit collection section 4004, and a Bit selection and pruning section 4005. The segmentation and CRC section 4010 includes at least one of a code block segmentation section 4011 and a Second CRC addition section 4012.

The input bit sequence $a_k$ is input to the first CRC addition section 4001. The CRC addition section 4001 generates first CRC bits $p_k$, based on the input bit sequence $a_k$. The first CRC bits are added to the input bit sequence $a_k$ to generate a sequence $b_k$. The first CRC addition section 4001 inputs the sequence $b_k$ into the segmentation and CRC section 4010. For example, the first CRC bits may be a sequence of 4 bits, 8 bits, 16 bits, or 24 bits. The first CRC bits may include the number of bits other than those described above.

The sequence $b_k$ is input to the code block segmentation section 4011. The code block segmentation section 4011 segments the sequence $b_k$ into one or more code blocks. The code block segmentation section 4011 may segment the sequence $b_k$ into a first code block set. In a case that a second code block set is input into the code block segmentation section 4011, the sequence $b_k$ may be segmented into the second code block set.

FIG. 6 illustrates an example of a first procedure for calculating the number of code blocks in the code block segmentation section 4011 according to an aspect of the present embodiment. Here, B represents the number of bits of the sequence $b_k$. Z represents an upper limit (maximum coding block length) of the number of bits of the code block. $N_{CB}$ represents the number of code blocks. B' represents a sum of the number of bits of second CRC bits added to each code block and the number of bits of the sequence $b_k$. L represents the number of bits of the second CRC bits added to one code block.

In a case that the number B of bits of the sequence $b_k$ is equal to or less than the maximum code block length Z, the number L of bits of the second CRC bits is equal to zero (L=0), and the number $N_{CB}$ of code blocks is equal to 1 ($N_{CB}$=1) and B'=B. On the other hand, in a case that the number B of bits of the sequence $b_k$ is greater than the maximum coding block length Z, L=24, and the number $N_{CB}$ of code blocks may be given by $N_{CB}$=floor(B/(Z−L)). Where floor(*) represents a function to output a minimum integer under a condition that the integer is not lower than "*". The function floor(*) is also referred to as a ceiling function.

The number B of bits of the sequence $b_k$ is given by a sum of the number A of bits of the input bit sequence $a_k$ and the number P of bits of the first CRC bits $p_k$. In other words, the number B of bits of the sequence $b_k$ is B=A+P.

The maximum code block length Z may be 6144 or 8192. The maximum code block length Z may be a value other than that described above. The maximum code block length Z may be given at least based on the scheme of the error-correction coding used in the coding procedure. For example, the maximum code block length Z may be 6144 in a case that a turbo code is used for the coding procedure. For example, the maximum code block length Z may be 8192 in a case that a Low Density Parity Check (LDPC) code is used for the coding procedure. Here, the LDPC code may be a Quasi-Cyclic LDPC (QC-LDPC) code.

The code block segmentation section 4011 segments the sequence $b_k$ into $N_{CB}$ code blocks $C_{rk}$, based on the calculated number of cord blocks $N_{CB}$. Here, r represents an index of the code block. The index r of the code block is given by an integer value within a range from 0 to $N_{CB}$−1.

The second CRC addition section 4012 may have a function to add the second CRC bits to each code block. For example, in a case that the number of code blocks $N_{CB}$=1, the second CRC bits may not be added to the code block. This corresponds a case that L=0 in a case that the number of code blocks is $N_{CB}$=1. On the other hand, in a case that the number of code blocks $N_{CB}$ is greater than 1, the second CRC bits with the number L of bits may be added to each of the coding blocks. The case that the number of code blocks $N_{CB}$ is greater than 1 corresponds to that the sequence $b_k$ is to be segmented into multiple code blocks. The output of the second CRC addition section 4012 is referred to as a code block $c_{rk}$. The code block $c_{rk}$ is the r-th code block.

The encoder section 4002 has a function to perform error-correction coding on a given code block $c_k$. The r-th code block $c_{rk}$ is input to the $c_k$. The encoder section 4002 performs error-correction coding on the code block $c_k$, and outputs a Coded bit sequence. In a case that a turbo code is used as an error-correction coding scheme, the coded bit sequence is $d_k^{(1)}$, $d_k^{(1)}$, and $d_k^{(2)}$. Here, $d_k^{(1)}$ is also referred to as a systematic bit. $d_k^{(1)}$ and $d_k^{(2)}$ are also referred to as parity bits.

The coded bit sequence may be constituted by one or more of sequences. The number of sequences constituting the coded bit sequence is also referred to as $N_{seq}$. In a case that the turbo code is used as an error-correction coding scheme, the coded bit sequence may be constituted by three sequences ($d_k^{(1)}$, $d_k^{(1)}$, and $d_k^{(2)}$). In other words, in the case that the turbo code is used as an error-correction coding scheme, $N_{seq}=3$. In a case that the LDPC code is used as an error-correction coding scheme, the coded bit sequence may be constituted by two sequences ($d_k^{(0)}$ and $d_k^{(1)}$). In other words, in the case that the LDPC code is used as an error-correction coding scheme, $N_{seq}=2$. In the case that the LDPC code is used as an error-correction coding scheme, $N_{seq}$ may be a value other than 2.

The coded bit sequence output from the encoder processing section 4002 is input to the sub-block interleaver section 4003 or the bit collection section 4004.

The sub-block interleaver section 4003 rearranges (sort, interleaves) the input coded bit sequence to output the rearrangement bit sequence $v_k^{(n)}$. n represents an integer within a range from 0 to $N_{seq}-1$. The sub-block interleaver is given by a matrix. The number $C_{subblock}$ of columns of the sub-block interleaver is 32. The number $R_{subblock}$ of rows of the sub-block interleaver may be the smallest integer that satisfies following relationship (1). Here, D represents the number of bits of each sequence $d_k^{(n)}$.

$$D \leq (R_{subblock} \times C_{subblock}) \quad \text{Equation 1}$$

The number $K_\Pi$ of bits of each rearrangement bit sequences $v_k^{(n)}$ which is the output of the sub-block interleaver section 4003 may be given by Equation 2 below.

$$K_\Pi = (R_{subblock} \times C_{subblock}) \quad \text{Equation 2}$$

In a case that the coded bit sequence is input into the bit collection section 4004, the rearrangement bits $v_k^{(n)}=d_k^{(n)}$.

The bit collection section 4004 generates a Virtual circular buffer, based on rearranging the rearrangement bit sequence $v_k^{(n)}$. For example, a virtual circular buffer $w_k$ may be generated based on $w_k=v_k^{(0)}$, $w_{K_\Pi+2}=v_k^{(1)}$, and $w_{K_\Pi+2k+1}=v_k^{(2)}$. Where $K_\Pi$ represents the number of bits of the $v_k^{(0)}$. In the turbo code, $K_w$ is a value expressed by $K_w=3K_\Pi$. The bit collection section 4004 outputs the virtual circular buffer $w_k$.

The virtual circular buffer $w_k$ may be generated by rearranging $N_{seq}$ rearrangement bit sequences $v_k^{(n)}$, based on a prescribed procedure. The virtual circular buffer $w_k$ is input to the bit selection and pruning 4005.

The bit selection and pruning 4005 performs a rate matching operation on the virtual circular buffer $w_k$ to generate a rate matching sequence $e_k$. FIG. 7 illustrates an example of the rate matching operation in the bit selection and pruning section 4005 according to an aspect of the present embodiment. A rate matching sequence $e_k$ is obtained from the virtual circular buffer $w_k$. The number of bits of the rate matching sequence $e_k$ is E. The number E of bits of the rate matching sequence $e_k$ is given based on at least resource allocation information for the transport block, and the like. $rv_{idx}$ in FIG. 7 represents a redundancy version (RV) number for transmission of a corresponding transport block. The RV number may be indicated by information included in the downlink control information. The RV number may be configured based on at least the higher layer signaling. $N_{cb}$ represents a soft buffer size per a code block and is expressed by the number of bits. $N_{cb}$ is given by Equation 3 below.

$$N_{cb} = \min\left(\left\lfloor \frac{N_{IR}}{N_{CB}} \right\rfloor, K_w\right) \quad \text{Equation 3}$$

Here, $N_{IR}$ represents a value associated with the soft buffer size per an input bit sequence $a_k$, and is expressed by the number of bits. $N_{IR}$ is given by the following Equation 4.

$$N_{IR} = \left\lfloor \frac{N_{soft}}{K_C \cdot K_{MIMO} \cdot \min(M_{DL\_HARQ}, M_{limit})} \right\rfloor \quad \text{Equation 4}$$

Here, in a case that the terminal apparatus 1 is configured to receive PDSCH transmission based on transmission mode 3, 4, 8, 9, or 10, $K_{MIMO}$ may be 2, and in other cases, $K_{MIMO}$ may be 1. $K_{MIMO}$ may be the same as the maximum number of transport blocks that can be included in one shared channel transmission received based on the transmission mode with which the terminal apparatus 1 is configured. $K_{MIMO}$ may be associated with the maximum number of transport blocks receivable during a prescribed period of time in a prescribed transmission method.

Here, $M_{DL\_HARQ}$ may be the maximum number of downlink HARQ processes. $M_{DL\_HARQ}$ may be the maximum number of downlink HARQ processes managed in parallel in a corresponding one serving cell. For an FDD serving cell, $M_{DL\_HARQ}$ may be 8. For a TDD serving cell, $M_{DL\_HARQ}$ may correspond to uplink/downlink configuration (UL/DL configuration). Here, $M_{limit}$ is 8. The uplink/downlink configuration is used in the TDD to indicate a mapping of the downlink subframe and the uplink subframe in the radio frame.

Here, the $K_c$ may be any one of {1, 3/2, 2, 8/3, 3, and 5} or may be other values.

Here, $N_{soft}$ represents a total number of soft channel bits in accordance with a UE category or a downlink UE category. Here, the soft channel bit is also referred to as a soft bit. The soft bit may be information given based on a Log Likelihood Ratio (LLR) or the like for the bits calculated after error-correcting decoding. For example, the soft bit may be an amount given based on at least the LLR. The soft bit may be a value associated with the LLR. $N_{soft}$ may be given by any one of a capability parameter ue-Category (without suffix), a capability parameter ue-Category-v1020, a capability parameter ue-Category-v1170, and a capability parameter ue-CategoryDL-r12. The UE category or the downlink UE category is information indicating functional information supported by the terminal apparatus 1.

The rate matching sequence $e_k$ corresponding to the r-th code block generated by the bit selection and pruning section 4005 is also referred to as a rate matching sequence $e_{rk}$. $N_{CB}$ rate matching sequences $e_{rk}$ are combined to generate a coded output sequence $f_k$. The coded output sequence $f_k$ is modulated, precoded, and the like, and is mapped to the radio resources and transmitted.

Hereinafter, coding based on a prescribed procedure in the coding unit 3071 included in the base station apparatus 3 will be described.

The coding unit 3071 is coded based on the coding procedure. Specifically, the coding unit 3071 includes at least some or all of a first CRC addition section 4001, a segmentation and CRC section 4010, an encoder section 4002, a sub-block interleaver section 4003, a bit collection section 4004, a bit selection and pruning section 4005. The input bit sequence $a_k$ input into the coding unit 3071 is a transport block. In at least an initial transmission, the number of bits of a transport block input into the coding unit 3071 may be given by is a first table identified by an index $I_{TBS}$ for a Transport Block Size (TBS) and the number $N_{PRB}$ of resource blocks of the shared channel used for transmission of the transport block. Here, the index $I_{TBS}$ for the TBS may be given based on at least an index $I_{MCS}$ indicating a Modulation and Coding Scheme (MCS). The index $I_{MCS}$ indicating the MCS may be given based on at least the downlink control information. The index $I_{MCS}$ indicating the MCS may be given based on at least the downlink grant indicating transmission of the transport block. $N_{PRB}$ may be given based on at least the downlink grant. $N_{PRB}$ may be given based on at least the downlink grant indicating transmission of the transport block.

In the code block segmentation section 4011, the number $N_{CB}$ of cord blocks may be given based on at least a condition X1. For example, in a case that the condition X1 is not satisfied, the number $N_{CB}$ of code blocks may be given based on the first procedure illustrated in FIG. 6. On the other hand, in a case that the condition X1 is satisfied, the number $N_{CB}$ of code blocks may be given based on a second procedure. The second procedure is described below. Here, the condition X1 being satisfied may be at least some or all of the condition x1 to a condition x3 being satisfied. The condition X1 being not satisfied may be at least some or all of the condition x1 to the condition x3 being not satisfied.

The number $N_{CB}$ of code blocks may be given based on the first procedure in the code block segmentation section 4011. In a case that the condition X1 is not satisfied, the number $N_{CB}$ of code blocks may be given based on the first procedure in the bit selection and pruning 4005. On the other hand, in a case that the condition X1 is satisfied, the number $N_{CB}$ of code blocks may be given based on the second procedure in the bit selection and pruning 4005.

The condition x1 is that the second code block set is transmitted, the second code block set including some of the code blocks among multiple code blocks (the first code block set) included in the transport block. The first code block set may be all code blocks included in the transport block. The transmission of the first code block set is also referred to as a first transmission. That is, the first transmission may be that the first code block set is transmitted including all the code blocks included in the transport block. The transmission of the second code block set is also referred to as a second transmission. That is, the second transmission may be that some of the code blocks included in the transport block are transmitted. In various aspects of the present embodiment, retransmission of the second code block set included in the transport block after the first code block set included in the transport block is initially transmitted is also referred to as a retransmission of the transport block. In various aspects of the present embodiment, retransmission of the first code block set after the first code block set included in the transport block is initially transmitted is also referred to as a retransmission of the transport block.

In the initial transmission of the transport block, the first transmission may be performed. In the retransmission of the transport block, the first transmission or the second transmission may be performed. Whether the first transmission or the second transmission corresponds to a retransmission of the transport block may be given based on at least a New Data Indicator (NDI). The new data indicator may indicate at least whether the transmission of the transport block corresponding to the new data indicator corresponds to an initial transmission or a retransmission. The new data indicator may be included in the downlink grant. The new data indicator may be indicated by a one-bit sequence. In a case that with respect to the first new data indicator corresponding to the transmission of the first transport block, the second new data indicator corresponding to the transmission of the second transport block transmitted later than the first transport block is toggled or is considered to be toggled, the transmission of the second transport block corresponds to (or is considered as) the initial transmission. In a case that with respect to the first new data indicator, the second new data index is not toggled or not considered to be toggled, the transmission of the second transport block corresponds to (or is considered as) the retransmission of the first transport block.

The new data indicator corresponding to the transmission of the transport block may be a new data index included in the downlink grant indicating the transmission of the transport block. Here, the toggling of the second new data indication to the first new data indication may mean that a second bit value indicative of the second new data indicator is different from or inverse to a first bit value (e.g., 0 or 1) indicating the first new data indicator. Here, the transmission of the first transport block and the transmission of the second transport block may correspond to the same Hybrid Automatic Retransmission reQuest (HARQ) process.

The HARQ process has a function to determine whether to discard data stored in the soft buffer, based on at least whether the received transport block is an initial transmitted one or a retransmitted one. In a case that the received transport block is an initial transmitted one, the data stored in the soft buffer is replaced with the received transport block. In a case that the received transport block is a retransmitted one and the transport block corresponding to the data stored in the soft buffer is not successfully decoded, the HARQ process combines the received transport block with the data. Here, the case that the transport block corresponding to the data stored in the soft buffer is not successfully decoded may indicate that the HARQ process indicates a Negative ACKnowledgement (NACK). In a case that the received transport block is a retransmitted one and a transport block size of the transport block corresponding to the data stored in the soft buffer is different from a transport block size of the received transport block, the data stored in the soft buffer may be replaced with the received transport block. Here, the received transport block may be data expressed by soft bits after decoding.

The received transport block may include the first code block set or the second code block set. The received transport block does not necessarily include all the code blocks included in the transport block (that is, the first code block set).

The HARQ process may determine whether the received transport block is an initial transmitted one or a retransmitted one, based on at least the new data indicator corresponding to the received transport block.

The soft buffer is a buffer that temporarily stores the received transport block.

The condition x2 is that a transmission of some (second code block set) of multiple code blocks included in the transport block (first code block set) is indicated. Specifically, the condition x2 may be that a transmission of the second code block set is indicated. The condition x2 may be that the second transmission is indicated.

The downlink grant may include information indicating which of the first transmission and the second transmission is to be used. For example, one bit of information included in the downlink grant may indicate whether a transmission corresponding to the downlink grant is the first transmission or the second transmission.

The downlink grant may include information indicating the second code block set. The information indicating the second code block set may be a bitmap indicating which of the code blocks included in the first code block set are to be transmitted. The information indicating the second code block set may be a bitmap indicating which of the code block groups constituted by the first code block set are to be transmitted. The information indicating the second code block set may indicate which of the first transmission and the second transmission is to be used.

FIGS. 8A and 8B are diagrams illustrating an example of the information indicating the second code block set according to an aspect of the present embodiment. In each of FIGS. 8A and 8B, an example is illustrated in which the transport block includes seven code blocks. In other words, in FIGS. 8A and 8B, the first code block set is constituted by seven code blocks. The information indicating the second code block set is expressed as a bitmap indicating which code block of the first code block set is transmitted, and indicates, in FIG. 8A, that the first code block (#0), the third code block (#2), and the sixth code block (#5) are transmitted. Here, that the bitmap is entirely set to 1 may mean the transmission of the first code block set (first transmission). In other words, the information indicating the second code block set may include information (or functions) indicating which of the first transmission and the second transmission is to be used.

In FIG. 8B, a code block group including multiple code blocks is configured. The information indicating the second code block set may be a bitmap of the code block group. In FIG. 8B, the information indicating the second code block set indicates that the first code block (#0) and the second code block (#1) are transmitted. Here, the bit map of the code block groups is entirely set to 1 may mean the transmission of the first code block set (first transmission). A configuration of the code block group (correspondence relationship between the code block and the code block group) may be given based on at least the higher layer signaling. The configuration of the code block group may be given in advance based on specifications and the like.

The information indicating the second code block set may be given by a prescribed number of bits. FIG. 9 is an example of the information indicating the second code block set according to an aspect of the present embodiment. In FIG. 9, the information indicating the second code block set is given by two bits, with each of code points ("00", "01", "10", and "11") indicating transmission of the second code block set or transmission of any code block of the first code block set. In FIG. 9, the code point "00" may indicate that code block group #0 is to be transmitted, and the code point "01" may indicate that code block group #1 is to be transmitted, the code point "10" may indicate that the code block group #2 is to be transmitted, and the code point "11" may indicate that the first code block set is to be transmitted.

The information indicating the second code block set may be given based on at least the higher layer signaling. The information indicating the second code block set may include the information indicating which of the first transmission and the second transmission is to be used. For example, the information indicating the second code block set may include information indicating which of the first transmission and the second transmission are to be used in retransmission of the transport block.

The higher layer signaling may include the information indicating which of the first transmission and the second transmission is to be used. For example, the higher layer signaling may include the information indicating which of the first transmission and the second transmission is to be used in retransmission of the transport block. The higher layer signaling may include the information indicating the second code block set.

The condition x3 is that the downlink grant includes the information indicating the second code block set.

In the case that the condition X1 is satisfied, the number $N_{CB}$ of code blocks may be given based on the second procedure. In the second procedure, the number $N_{CB}$ of code blocks may be indicated by the downlink grant. In the second procedure, the number $N_{CB}$ of code blocks may be indicated by the second code block set. In the second procedure, the number $N_{CB}$ of code blocks may be given based on at least the information indicating the second code block set. In the second procedure, the number $N_{CB}$ of code blocks may be given based on at least an immediately preceding reception acknowledgment. The reception acknowledgment indicates at least whether the transport block or the code block has been successfully decoded (ACK/NACK). The ACK is also referred to as a Positive ACK. The ACK is also referred to as an Acknowledgement.

In various aspects of the present embodiment, the reception acknowledgment generated and transmitted by the terminal apparatus 1 for the transport block may indicate a reception acknowledgment for each code block (or code block group). Here, the reception acknowledgment may be information indicating whether decoding of the transport block (or the code block or the code block group) has been successfully has completed.

Specifically, in the second procedure, the number $N_{CB}$ of code blocks may be the number of code blocks of which decoding could not be successfully completed. The number of code blocks of which decoding could not be successfully completed may be the number of code blocks of which decoding cannot be successfully completed that is indicated in the immediately preceding reception acknowledgement. The number of code blocks of which decoding could not be successfully completed may be the number of code blocks each for which a NACK is indicated in the reception acknowledgement for the most recently received code block.

Here, the immediately preceding reception acknowledgement may be an immediately preceding reception acknowledgement for the transport block corresponding to the same HARQ process.

Hereinafter, various aspects of the terminal apparatus 1 and the base station apparatus 3 according to the present embodiment will be described.

(1) To accomplish the object described above, aspects of the present invention are contrived to provide the following measures. Specifically, a first aspect of the present invention is a terminal apparatus including a receiver configured to receive a transport block, based on a downlink grant, the transport block being subjected to segmentation into a plurality of first code blocks, and a decoding unit configured to decode the plurality of first code blocks, in which each of the plurality of first code blocks is coded based on a soft buffer size, the soft buffer size is given based on at least a first value, the first value is the number of the plurality of first code blocks in an initial transmission of the transport block, the number of the plurality of first code blocks is given based on a size of the transport block, the size of the transport block is given based on at least an MCS field included in the downlink control information, in a case that at least one second code block is retransmitted, the first value is the number of the at least one second code block, and the at least one second code block includes some code blocks of the plurality of first code blocks resulting from the segmentation.

(2) In the first aspect of the present invention, the number of the at least one second code block is indicated by a first field included in the downlink control information or given based on a reception acknowledgment for the transport block.

(3) In the first aspect of the present invention, the segmentation is based on the size of the transport block.

(4) A second aspect of the present invention is a base station apparatus including a transmitter configured to transmit a transport block, based on a downlink grant, the transport block being subjected to segmentation into a plurality of first code blocks, and a coding unit configured to code the plurality of first code blocks, in which each of the plurality of first code blocks is coded based on a soft buffer size, the soft buffer size is given based on at least a first value, the first value is the number of the plurality of first code blocks in an initial transmission of the transport block, the number of the plurality of first code blocks is given based on a size of the transport block, the size of the transport block is given based on at least an MCS field included in the downlink control information, in a case that at least one second code block is retransmitted, the first value is the number of the at least one second code block, and the at least one second code block includes some code blocks of the plurality of first code blocks resulting from the segmentation.

(5) In the second aspect of the present invention, the number of the at least one second code block is indicated by a first field included in the downlink control information or given based on a reception acknowledgment for the transport block.

(6) In the second aspect of the present invention, the segmentation is based on the size of the transport block.

The above configuration allows the terminal apparatus 1 to efficiently transmit and receive data. The above configuration allows the base station apparatus 3 efficiently transmit and receive data.

Each of a program running on the base station apparatus 3 and the terminal apparatus 1 according to an aspect of the present invention may be a program that controls a Central Processing Unit (CPU) and the like, such that the program causes a computer to operate in such a manner as to realize the functions of the above-described embodiment according to the present invention. The information handled in these apparatuses is transitorily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In this case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus built into the computer system such as a hard disk.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (an apparatus group) including multiple apparatuses. Each of the apparatuses configuring such an apparatus group may include some or all of the functions or the functional blocks of the base station apparatus 3 according to the above-described embodiment. The apparatus group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case that with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a radio LAN apparatus, or a sensor device), an integrated circuit (for example, a communication chip), or a program.

REFERENCE SIGNS LIST 1 (1A, 1B, 1C) Terminal apparatus
3 Base station apparatus
101 Higher layer processing unit
103 Controller
105 Receiver
107 Transmitter
109 Transmit and receive antenna
301 Higher layer processing unit
303 Controller
305 Receiver
307 Transmitter
309 Transmit and receive antenna
1011 Radio resource control unit
1013 Scheduling unit
1051 Decoding unit
1053 Demodulation unit
1055 Demultiplexing unit
1057 Radio receiving unit
1059 Channel measurement unit
1071 Coding unit
1073 Shared channel generation unit
1075 Control channel generation unit
1077 Multiplexing unit
1079 Radio transmitting unit
10711 Uplink reference signal generation unit
3011 Radio resource control unit
3013 Scheduling unit
3051 Data demodulation/decoding unit
3053 Control information demodulation/decoding unit
3055 Demultiplexing unit
3057 Radio receiving unit
3059 Channel measurement unit
3071 Coding unit
3073 Modulation unit
3075 Multiplexing unit
3077 Radio transmitting unit
3079 Downlink reference signal generation unit
4001 First CRC addition section
4010 Segmentation and CRC section
4011 Code block segmentation section
4012 Second CRC addition section
4002 Encoder section
4003 Sub-block interleaver section
4004 Bit collection section
4005 Bit selection and pruning section

The invention claimed is:

1. A terminal apparatus comprising:
reception circuitry configured to receive a transport block, based on a downlink control information (DCI) format, the transport block being subjected to segmentation into a plurality of code blocks;
decoding circuitry configured to decode the plurality of code blocks, wherein
each of the plurality of code blocks is coded based on a size of a soft buffer $N_{cb}$,
in a case of an initial transmission of the transport block, the size of the soft buffer $N_{cb}$ is given by $$N_{cb} = \min\left(\left\lfloor \frac{N_{IR}}{N_{CB1}} \right\rfloor, K_w\right),$$

$N_{IR}$ being a value associated with the size of the soft buffer, $N_{CB1}$ being a quantity of the plurality of code blocks, and $K_w$ being a quantity of coded bits of the transport block,
the quantity of the plurality of code blocks is given based on a size of the transport block,
the size of the transport block is given based at least on a Modulation and Coding Scheme (MCS) field included in the DCI format,
in a case that first code blocks in the plurality of code blocks are transmitted in a retransmission of the transport block and at least one second code block in the plurality of code blocks is not transmitted in the retransmission, the size of the soft buffer $N_{cb}$ is given by $$N_{cb} = \min\left(\left\lfloor \frac{N_{IR}}{N_{CB2}} \right\rfloor, K_w\right),$$

$N_{CB2}$ being a quantity of the first code blocks.

2. A communication method for a terminal apparatus, the communication method comprising:
receiving a transport block, based on a downlink control information (DCI) format, the transport block being subjected to segmentation into a plurality of code blocks; and
decoding the plurality of code blocks, wherein
each of the plurality of code blocks is coded based on a size of a soft buffer $N_{cb}$,
in a case of an initial transmission of the transport block, the size of the soft buffer $N_{cb}$ is given by $$N_{cb} = \min\left(\left\lfloor \frac{N_{IR}}{N_{CB1}} \right\rfloor, K_w\right),$$

$N_{IR}$ being a value associated with the size of the soft buffer, $N_{CB1}$ being a quantity of the plurality of code blocks, and $K_w$ being a quantity of coded bits of the transport block, the quantity of the plurality of code blocks is given based on a size of the transport block, the size of the transport block is given based at least on a Modulation and Coding Scheme (MCS) field included in the DCI format, in a case that first code blocks in the plurality of code blocks are transmitted in a retransmission of the transport block and at least one second code block in the plurality of code blocks is not transmitted in the retransmission, the size of the soft buffer $N_{cb}$ is given by $$N_{cb} = \min\left(\left\lfloor \frac{N_{IR}}{N_{CB2}} \right\rfloor, K_w\right),$$

$N_{CB2}$ being a quantity of the first code blocks.

* * * * *